United States Patent [19]

Murata et al.

[11] Patent Number: 4,524,633
[45] Date of Patent: Jun. 25, 1985

[54] SUPPORTING STRUCTURE FOR A FLOOR-MOUNTED TYPE SPEED CHANGE LEVER

[75] Inventors: Masanori Murata; Isao Hayashi, both of Yokohama, Japan

[73] Assignee: Nissan Motor Co., Ltd., Yokohama, Japan

[21] Appl. No.: 377,191

[22] Filed: May 11, 1982

[30] Foreign Application Priority Data

May 13, 1981 [JP] Japan .................. 56-71993

[51] Int. Cl.³ .................. G05G 9/16; G05G 7/16
[52] U.S. Cl. .................. 74/473 R; 248/583; 248/632; 403/225
[58] Field of Search .............. 74/471 XY, 473 R; 403/225, 226, 228; 248/632, 635, 583

[56] References Cited

U.S. PATENT DOCUMENTS

| 1,942,115 | 1/1934 | Milone | 74/473 X |
| 2,149,622 | 3/1939 | Nickelsen | 403/226 |
| 2,900,161 | 8/1959 | Crede | 248/638 X |
| 3,171,622 | 3/1965 | Tolan | 248/635 |
| 3,193,628 | 7/1965 | Wanlass | 74/471 XY X |
| 3,282,602 | 11/1966 | Willingshofer et al. | 403/226 X |
| 3,585,319 | 6/1971 | Akron et al. | 74/471 XY X |
| 4,034,996 | 7/1977 | Manita et al. | 403/228 X |
| 4,364,450 | 12/1982 | Kemp et al. | 248/632 X |

FOREIGN PATENT DOCUMENTS

| 1787855 | 1/1959 | Fed. Rep. of Germany . |
| 2658274 | 7/1977 | Fed. Rep. of Germany .... 74/473 R |
| 2336269 | 7/1977 | France . |

Primary Examiner—Allan D. Herrmann
Attorney, Agent, or Firm—Schwartz, Jeffery, Schwaab, Mack, Blumenthal & Koch

[57] ABSTRACT

A supporting structure for a floor-mounted type speed change lever of a motor vehicle is disclosed, which comprises two identically constructed supporting units which are mounted to the vehicle floor and oriented abreast facing toward the front of the vehicle, the two supporting units being arranged to put therebetween an enlarged spherical portion formed on the lever so that the lever is pivotal at the spherical portion relative to the supporting units. The supporting structure is characterized in that each of the units comprises at least two parallel elastic blocks which are spaced from each other in a direction in which the lever extends.

4 Claims, 6 Drawing Figures

SUPPORTING STRUCTURE FOR A FLOOR-MOUNTED TYPE SPEED CHANGE LEVER

BACKGROUND OF THE INVENTION

The present invention relates in general to a speed change lever supporting structure of a motor vehicle, and more particularly to a supporting structure for a floor-mounted type speed change lever.

SUMMARY OF THE INVENTION

It is an essential object of the present invention to provide a supporting structure for a floor-mounted type speed change lever, which assures a dependable positive select feeling upon a select operation of the speed change lever.

According to the present invention, there is provided a supporting structure for a floor-mounted type speed change lever of a motor vehicle, comprising two identically constructed supporting units which are mounted to the vehicle floor and oriented abreast facing toward the front of the vehicle, the two supporting units being arranged to put therebetween an enlarged spherical portion formed on the lever so that the lever is pivotal at the spherical portion relative to the supporting units, which is characterized in that each of the units comprises at least two parallel elastic blocks which are spaced from each other in a direction in which the lever extends.

BRIEF DESCRIPTION OF THE DRAWINGS

Other objects and advantages of the present invention will become apparent from the following description when taken in conjunction with the accompanying drawings, in which.

DESCRIPTION OF THE PRIOR ART

Prior to describing the invention, a conventional speed change lever supporting structure will be described with reference to FIGS. 1, 2 and 3 in order to clarify the invention.

Figure 1:
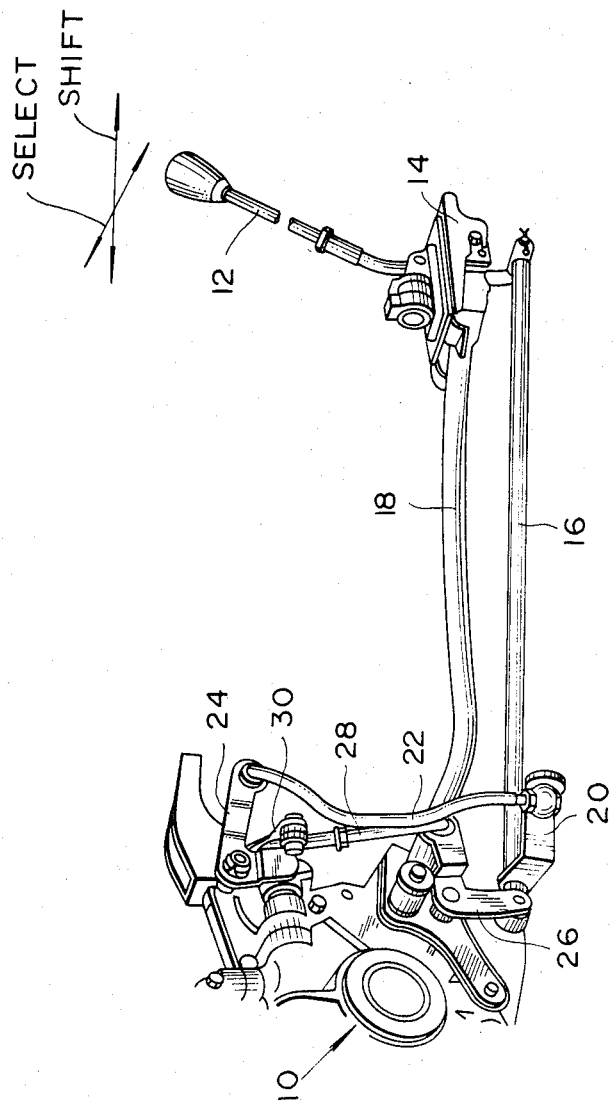
FIG. 1 is a perspective view of a floor-mounted type speed change lever in association with a manual transmission.

Referring to FIG. 1, there is shown a floor-mounted type speed change lever in association with a manual transmission 10. The speed change lever 12 is pivotally supported by a supporting structure 14 which is mounted on a floor (not shown) of the vehicle. The speed change lever 12 is movable in both directions as indicated by the arrows "SELECT" and "SHIFT" in the drawing. The lower end of the lever 12 is pivotally connected to a control rod 16 which leads to the transmission 10. Designated by numeral 18 is a lower support rod which spans between the speed change lever supporting structure 14 and the transmission 10.

Upon a select operation achieved by moving the speed change lever 12 in the "SELECT" direction, the control rod 16 is rotated about the axis thereof thereby to select one of several shift forks (not shown) arranged in the transmission 10, through a first select lever 20, a select rod 22, and a second select lever 24. While, upon a shift operation achieved by moving the speed change lever 12 in the "SHIFT" direction after the select operation, the control rod 16 is moved along the axis thereof thereby to locate the selected shift fork into its operating position, through a first shift lever 26, a shift rod 28 and a second shift lever 30.

Figure 2:
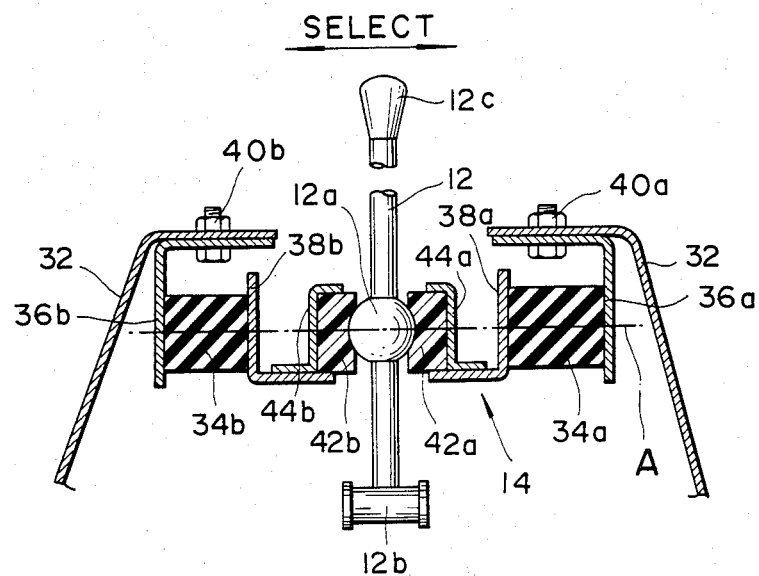
FIG. 2 is a sectional view of a conventional supporting structure for the floor-mounted type speed change lever.
Figure 3:
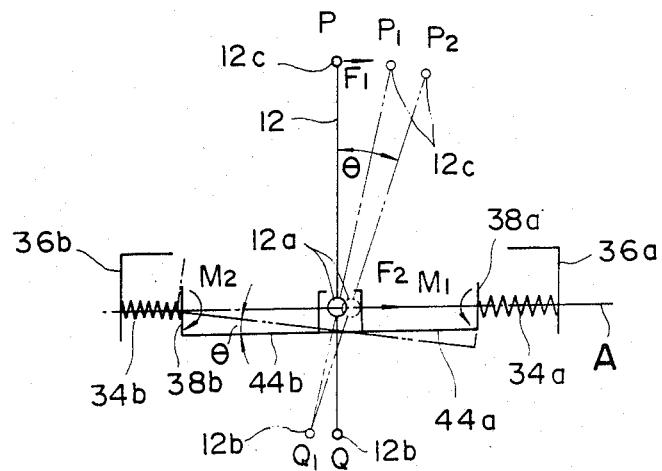
FIG. 3 is a diagrammatical illustration of the conventional supporting structure, depicting the operating manner of the structure.

One conventional supporting structure for the speed change lever 12 is shown in FIG. 2. The supporting structure shown comprises two identically constructed supporting units which are mounted to an inside of a tunnel 32 integrally formed on the vehicle floor. These supporting units are oriented abreast facing toward the front of the vehicle. Each supporting unit comprises a primary rubber block 34a or 34b which spans between an outside bracket 36a or 36b and an inside bracket 38a or 38b. Each outside bracket is secured at its upper bent section to the upper portion of the tunnel 32 by means of bolts and nuts 40a or 40b. Each inside bracket holds at its lower bent section a secondary rubber block 42a or 42b through a retainer 44a or 44b. As shown, the two secondary rubber blocks 42a and 42b face to each other provide therebetween a suitable clearance. The speed change lever 12 has at its lower section an enlarged spherical portion 12a which is pivotally sandwiched between the spaced two secondary rubber blocks 42a and 42b. In the conventional supporting structure as described hereinabove, the primary rubber blocks 34a and 34b are so arranged as to include therein a horizontal line A passing through the center of the spherical portion 12a in order to effectively absorb the undesired vibration which would be transmitted from the transmission 10 to the speed change lever 12 through the control rod 16 and the lower support rod 18. The speed change lever 12 has at its lower end a connector 12b to which the control rod 16 is pivotally connected, and at its upper end a grip 12c handled by an operator of the vehicle.

In the following, the operating manner of the conventional supporting structure will be described with reference to the diagrammatical illustration of FIG. 3. When, for example, the grip 12c of the speed change lever 12 is moved by an operating force $F_1$ from the neutral position P to a position $P_1$ where a select operation is completed, the speed change lever 12 is pivoted at the spherical portion 12a thereof shifting the connector 12b from the neutral position Q to a position $Q_1$. The shifting of the connector 12b induces rotation of the control rod 16 about the axis thereof.

Usually, the hardness of each primary rubber block 34a or 34b is so set not to cause a substantial displacement or shifting of the spherical portion 12a of the speed change lever 12 relative to the supporting structure so long as the lever 12 is under the normal select operation induced by the grip 12c being moved from the position P to the position $P_1$. However, in practical usage, the grip 12c is forced to move by an operating force which is greater than the force $F_1$. Thus, under this condition, the speed change lever 12 is subjected to over pivoting or over stroke thereby assuming a position as indicated by a phantom line passing through a point $P_2$ and the point $Q_1$, inducing a considerable displacement of the spherical portion 12a of the lever 12. In other words, under such condition, the speed change lever 12 is compelled to make an unnecessary further pivoting about the point $Q_1$, compressing and stretching the primary rubber blocks 34a and 34b respectively. Furthermore, by the further pivoting movement of the lever 12 about the point $Q_1$, there is produced a certain moment which forces the supporting structure to incline by an angle of $\theta$ relative to the horizontal line A. This means that the primary rubber blocks 34a and 34b are applied with certain twisting moments $M_1$ and $M_2$. Since, usually, the resistance of each rubber block 34a or 34b against such twisting moment is not high, undesired over stroke of the speed change lever 12 takes place by only a relatively low operating force. This produces the result that a select feeling given at the select operation becomes poor, that is, undesired "limp feeling" is produced, so that comfortable speed change operation is not expected from the above-mentioned supporting structure.

DETAILED DESCRIPTION OF THE INVENTION

Therefore, it is an essential object of the present invention to provide a supporting structure of a floor-mounted type speed change lever, which is free of the above-mentioned drawbacks encountered in the conventional structure.

Figure 4:
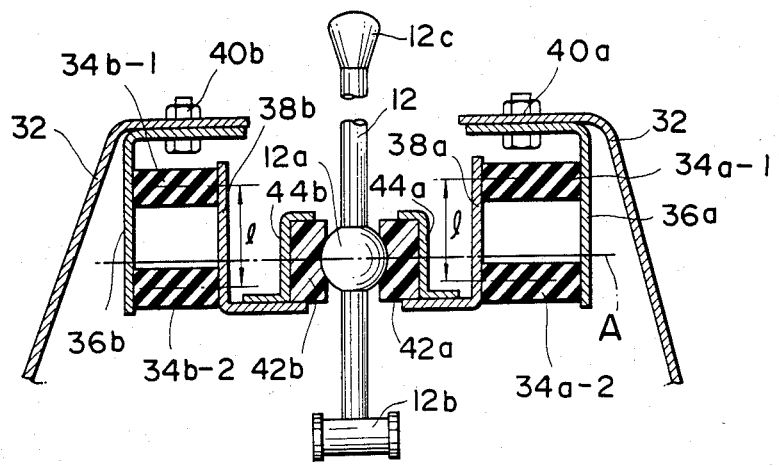
FIG. 4 is a sectional view of a supporting structure of the floor-mounted type speed change lever, according to the present invention.

Referring to FIG. 4, there is shown an improved supporting structure according to the present invention, in which substantially the same parts and portions as those of FIG. 2 are designated by the same numerals. As will be apparent when comparing FIG. 4 with FIG. 2, the supporting structure of the invention comprises generally the same parts as those of FIG. 2 except for the primary rubber blocks. In the invention, two vertically spaced primary rubber blocks 34a-1 and 34a-2 (or 34b-1 and 34b-2) are employed, which span between the corresponding outside bracket 36a or 36b and the corresponding inside bracket 38a or 38b. Instead of rubber blocks, any kind of shock absorbing materials may be used in the invention. These rubber blocks are secured to the corresponding brackets by means of adhesive material or by way of vulcanization. The paired rubber blocks 34a-1 and 34a-2 (or, 34b-1 and 34b-2) are shown to be spaced from each other by a distance l. It is to be noted that the horizontal line A passing through the center of the spherical portion 12a of the lever 12 lies between the respective spaced paired rubber blocks 34a-1 and 34a-2, and 34b-1 and 34b-2, as shown.

Figure 5:
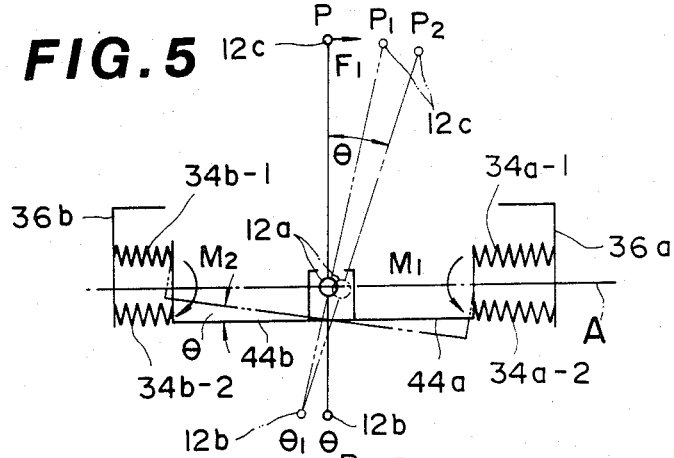
FIG. 5 is a diagrammatical illustration of the speed change lever supporting structure of the invention, depicting the operating manner of the structure.

In the following, the operating manner of the supporting structure of the invention will be described with reference to FIG. 5. When the speed change lever 12 is subjected to over pivoting or over stroke as mentioned hereinabove, the lever 12 pivots about the point $Q_1$ from the position $P_1$-$Q_1$ to the position $P_2$-$Q_1$ inducing a displacement of the spherical portion 12a of the lever 12, similar to the case of the conventional structure. With the displacement of the spherical portion 12a, a certain amount of rotation moment is produced which forces the supporting structure to incline by an angle of $\theta$ relative to the horizontal line A. This phenomenon causes the two paired rubber blocks 34a-1 and 34a-2, and 34b-1 and 34b-2 to be applied with certain twisting moments $M_1$ and $M_2$. However, because of the spaced arrangement between the paired rubber blocks of each group allowing an increase in the distance factor of each moment, the twisting moments $M_1$ and $M_2$ thus generated fail to induce a greater deformation of the rubber blocks. Accordingly, when the speed change lever 12 is intended to make a further pivoting from the position $P_1$-$Q_1$, a positive select feeling is given instantly. In fact, when shifting the lever 12 to the position $P_2$-$Q_1$ is intended, much greater operating force is required as compared with the case of the conventional structure.

Figure 6:
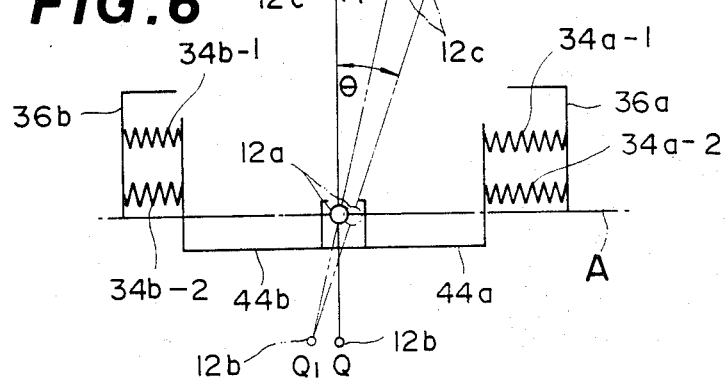
FIG. 6 is a view similar to FIG. 6, but showing a modification of the speed change lever supporting structure of the invention.

Referring to FIG. 6, there is shown a diagrammatical illustration showing a modification of the present invention. The construction of this modification is the same as that of the above-mentioned one except for the positional relationship between the two paired rubber blocks (34a-1 and 34a-2, and 34b-1 and 34b-2) and the horizontal line A passing through the center of the spherical portion 12a of the lever 12. In this modification, the horizontal line A lies below the respective spaced paired rubber blocks, as shown. To those skilled in the art, it is obvious that the operating manner of this modification is substantially the same as that of the structure of FIG. 4.

What is claimed is:

1. A supporting structure for a floor-mounted type speed change lever of a motor vehicle, comprising two identically constructed supporting units which are mounted to the vehicle floor and oriented abreast facing toward the front of said vehicle, the two supporting units being arranged to receive therebetween an enlarged spherical portion formed on said lever so that said lever is pivotal at said spherical portion relative to said supporting units, wherein each of said units comprises at least two parallel elastic blocks which are spaced from each other in a direction in which said lever extends.

2. A supporting structure as claimed in claim 1, wherein the paired elastic blocks of each unit are arranged such that a horizontal line which passes through the center of said spherical portion of said lever passes between the paired elastic blocks of each unit.

3. A supporting structure as claimed in claim 1, wherein the paired elastic blocks of each unit are arranged such that a horizontal line which passes through the center of said spherical portion of said lever passes below said paired elastic blocks of each unit.

4. A supporting structure as claimed in claim 1, wherein each unit comprises a first bracket secured to said vehicle floor, a second bracket, and another elastic block supported by said second bracket and pivotally engaging with said spherical portion of the lever to hold the same, and said two parallel elastic blocks of each unit span between said first and second brackets.

* * * * *